United States Patent
Cai et al.

(10) Patent No.: US 8,351,964 B2
(45) Date of Patent: Jan. 8, 2013

(54) MESSAGE DELIVERY OVER LTE NETWORKS

(75) Inventors: Yigang Cai, Naperville, IL (US); Jay Bhatt, Naperville, IL (US); Gyan Shanker, Naperville, IL (US)

(73) Assignee: Alcatel Lucent, Paris (FR)

( * ) Notice: Subject to any disclaimer, the term of this patent is extended or adjusted under 35 U.S.C. 154(b) by 521 days.

(21) Appl. No.: 12/495,331

(22) Filed: Jun. 30, 2009

(65) Prior Publication Data

US 2010/0331023 A1    Dec. 30, 2010

(51) Int. Cl.
*H04W 4/00* (2009.01)
*H04W 68/00* (2009.01)

(52) U.S. Cl. .................... 455/466; 455/458

(58) Field of Classification Search ............ 455/458, 455/466, 411, 436, 414.4, 414.2, 456.5, 432.1, 455/418, 126, 78, 406, 437; 709/227, 230; 370/401, 389, 332, 328, 331, 338, 230, 221, 370/352, 315; 380/247

See application file for complete search history.

(56) References Cited

U.S. PATENT DOCUMENTS

| 6,611,516 B1 | 8/2003 | Pirkola et al. | |
| 2009/0176513 A1* | 7/2009 | Bosch et al. | 455/458 |

FOREIGN PATENT DOCUMENTS

EP    1998526 A1    1/2008

OTHER PUBLICATIONS

"Support of Short Message Service (SMS) over generic 3GPP Internet Protocol (IP) access (3GPP TS 23204)" 3rd Generation Partnership Project (3GPP) Standard, Mar. 2009 XP050363059 section 6.14; all pages.

* cited by examiner

*Primary Examiner* — Kiet Doan
(74) *Attorney, Agent, or Firm* — Duft Bornsen & Fishman LLP

(57) ABSTRACT

Communication networks and methods are disclosed for delivering messages over LTE networks. One embodiment comprises a universal message center operable to deliver messages over an LTE network. The universal message center receives a message intended for a destination mobile device, and determines if the destination mobile device is LTE enabled. If the destination mobile device is LTE enabled, then the universal message center identifies a mobile IP address assigned to the destination mobile device in the LTE network. The universal message center then attempts to forward the message to the destination mobile device over the LTE network based on the mobile IP address. If the destination mobile device is not LTE enabled, then the universal message center identifies a store-and-forward (SFD) message center for an originator of the message, and forwards the message to the SFD message center for store-and-forward processing.

18 Claims, 14 Drawing Sheets

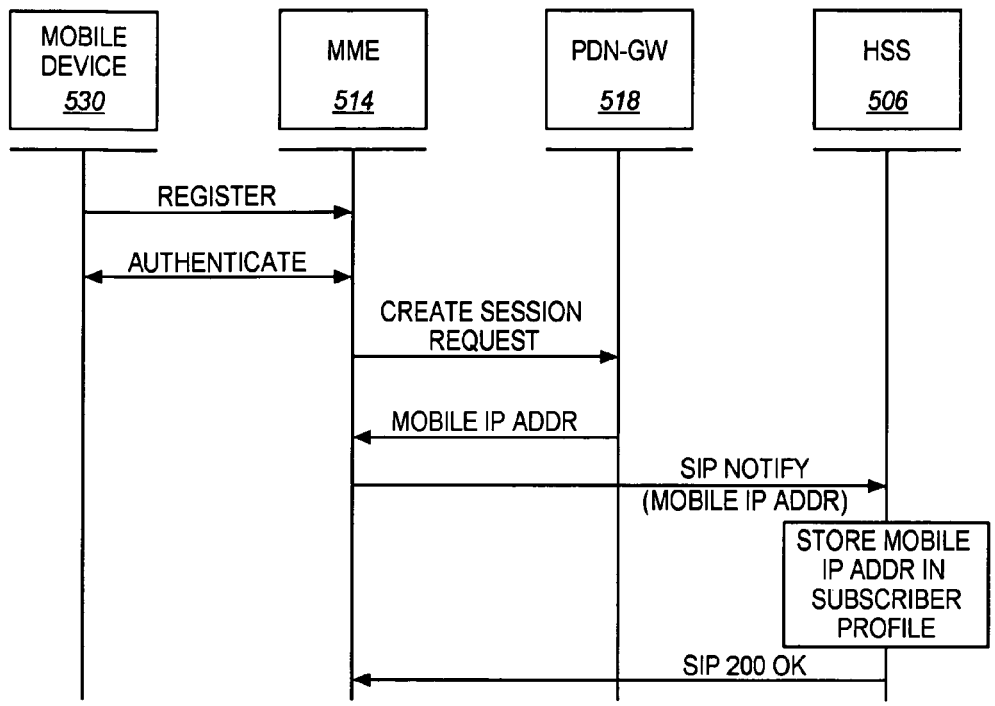
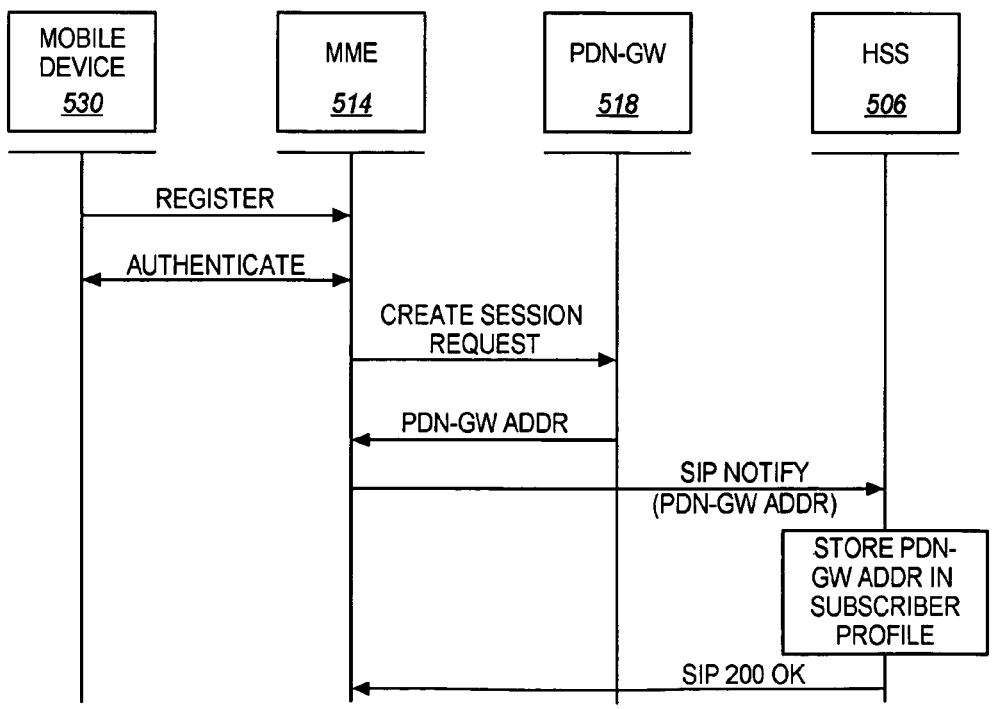

MESSAGE DELIVERY OVER LTE NETWORKS

BACKGROUND

1. Field of the Invention

The invention is related to the field of communication networks and, in particular, to message delivery over LTE networks.

2. Statement of the Problem

Service providers provide numerous voice and/or data services to subscribers using mobile devices, one of which is text and multimedia messaging. In many mobile networks, text/multimedia messaging has become a very popular mode of communication. One example of a text messaging service is Short Message Service (SMS), which is a communication protocol allowing the exchange of short text messages (i.e., 160 characters) between mobile devices. One example of a multimedia messaging service is Multimedia Message Service (MMS), which is a communication protocol allowing the exchange of multimedia messages (i.e., digital pictures, media clips, etc) between mobile devices. Often times, mobile users more frequently use text or multimedia messaging for communication than voice calls.

There are a variety of types of networks operable to provide voice and data communications for mobile users. The 3rd Generation Partnership Project (3GPP, 3GPP2) puts forth specifications defining standards for communicating over these networks. One present project within the 3GPP is the Long Term Evolution (LTE) which is a project to improve the UMTS mobile phone standard to cope with future requirements. The architecture defined by this project is referred to as the Evolved Packet System (EPS). The EPS architecture comprehends E-UTRAN (Evolved UTRAN) on the access side and EPC (Evolved Packet Core) on the core side.

Presently, the 3GPP specifications rely on legacy Short Messaging Service Centers (SMSC) and Multimedia Messaging Service Centers (MMSC) for message delivery. Legacy SMSCs and MMSCs are not able to deliver messages to a mobile device over an LTE network. Thus, even if a mobile device is registered with an LTE network, the mobile device is not able to receive SMS or MMS messages over the LTE network.

SUMMARY

Embodiments described herein are able to deliver text, multimedia, or other types of messages directly over an LTE network. When a message is received that is destined for a mobile device that is LTE enabled, the mobile IP address for the mobile device is identified. Delivery of the message is then attempted to the mobile device based on the mobile IP address over the LTE network without first forwarding the message to a legacy SMSC/MMSC. Thus, some of the message traffic may be advantageously offloaded from the legacy SMSCs/MMSCs to the LTE network.

One embodiment comprises a universal message center operable to deliver messages over an LTE network. The universal message center comprises a control system operable to receive a message intended for a destination mobile device, and to determine if the destination mobile device is LTE enabled. If the destination mobile device is LTE enabled, then the control system is further operable to identify a mobile IP address assigned to the destination mobile device in the LTE network. The universal message center further comprises a delivery system, such as a First Delivery Attempt (FDA) system, operable to attempt to forward the message to the destination mobile device over the LTE network based on the mobile IP address. If the destination mobile device is not LTE enabled, then the control system is further operable to identify a store-and-forward (SFD) message center for an originator of the message, and forward the message to the SFD message center for store-and-forward processing.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 6 is a message diagram illustrating the registration of a mobile device with an LTE network in an exemplary embodiment.

FIG. 7 is a message diagram illustrating the registration of a mobile device with an LTE network in another exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
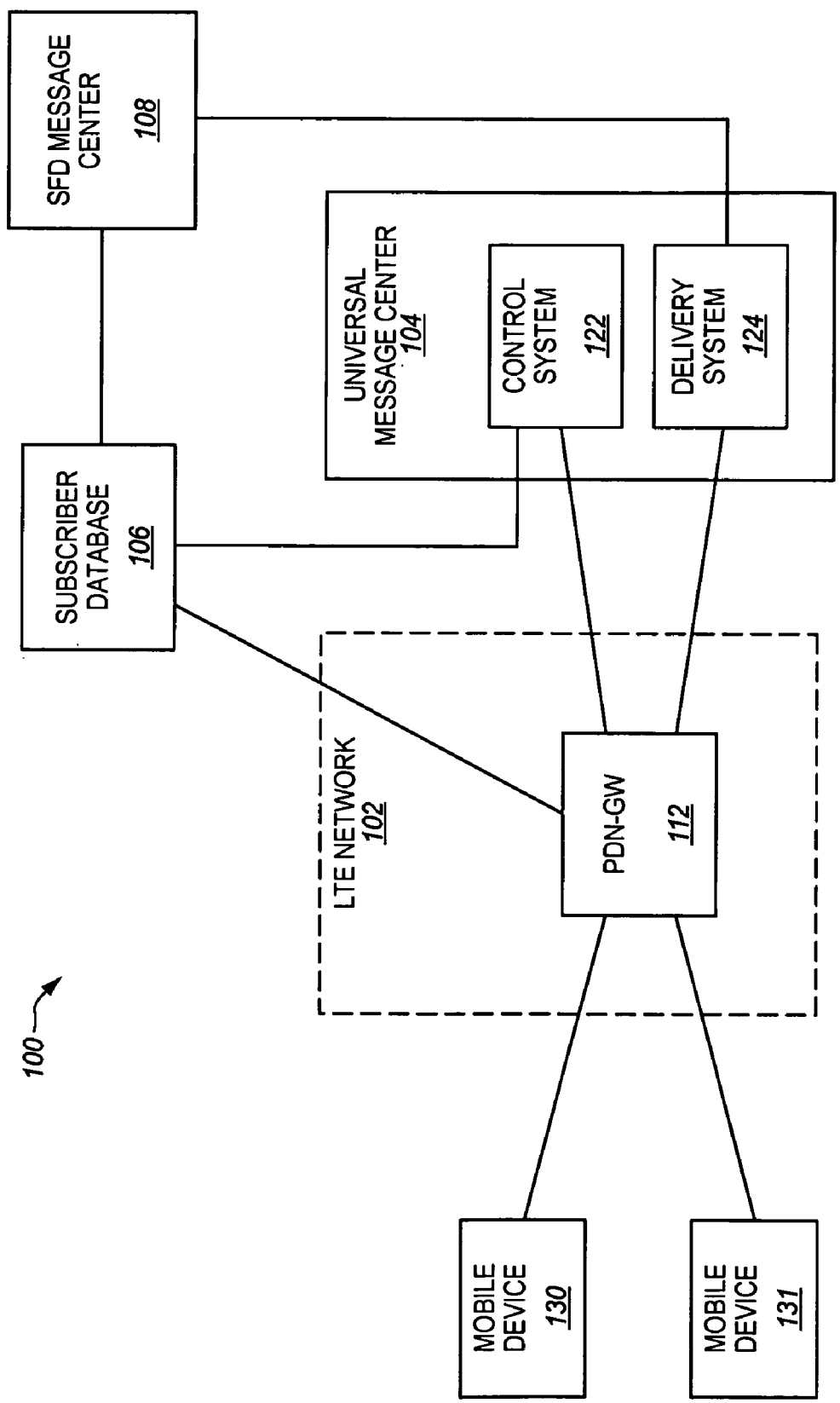
FIG. 1 illustrates a communication network in an exemplary embodiment.

FIG. 1 illustrates a communication network 100 in an exemplary embodiment. Communication network 100 includes an LTE network 102, a universal message center 104, a subscriber database 106, and a store-and-forward (SFD) message center 108. LTE network 102 includes a Packet Data Network gateway (PDN-GW) 112 that provides connectivity between user equipment (such as mobile devices 130-131) and external packet networks, such as the internet PDN-GW 112 also routes traffic to and from the user equipment, allocates IP addresses to the user equipment, etc. Those skilled in the art will appreciate that LTE network 102 may include other network elements, such as a serving gateway (S-GW) and a Mobility Management Entity (MME).

Universal message center 104 comprises any network element operable to deliver messages to user equipment over LTE network 102. Universal message center 104 may be implemented as a stand alone element in an Evolved Packet Core (EPC) network. In another embodiment, universal message center 104 may be implemented in an SMSC, in an MMSC, or in another network element. Universal message center 104 includes a control system 122 and a delivery system 124. One example of a delivery system 124 may comprise a First Delivery Attempt (FDA) system operable to perform FDA processing. In FDA processing, when a message is initially received, delivery of the message is attempted first before storing the message. Those skilled in the art will appreciate that FDA processing may involve briefly queuing the messages for the delivery attempt. However, the message is not persistently stored as is done for store-and-forward processing.

Subscriber database 106 comprises any database or similar system that stores and maintains subscriber information or subscriber data for one or more subscribers. For instance, subscriber database 106 may maintain subscriber data in the form of a subscriber record or subscriber profile for a user of mobile devices 130-131. One example of subscriber database 106 is a Home Subscriber Server (HSS).

SFD message center 108 comprises any network element operable to handle the delivery of messages using store-and-forward processing. For example, SFD message center 108 may comprise an SMSC that implements SMS protocol to deliver text or SMS messages. In another example, SFD message center 108 may comprise an MMSC that implements MMS protocol to deliver multimedia or MMS messages. Store-and-forward processing refers to the process of delivering a message by first storing (persistently) the message, and then initiating a delivery attempt for the message. If the first delivery attempt is unsuccessful, then one or more retry attempts are performed until the message is delivered or is discarded. One assumption is that SFD message center 108 traditionally delivers messages to mobile devices over a non-LTE network, such as a UMTS network.

In this embodiment, assume that mobile device 130 registers or subscribes to service with LTE network 102. Mobile device 130 has a static IP address that is pre-assigned. When mobile device 130 registers with LTE network 102, a network element in LTE network 102 assigns a dynamic IP address to mobile device 130 while it is registered. For example, PDN-GW 112 may assign the dynamic IP address to mobile device 130. In another example, a serving gateway (not shown) may assign the dynamic IP address to mobile device 130. The dynamic IP address is used for routing signaling messages to mobile device 130, and is referred to herein as the mobile IP address. Mobile device 131 registers in a similar manner and is also assigned a mobile IP address within LTE network 102.

With mobile devices 130-131 registered with LTE network 102, messages may be exchanged between mobile devices 130-131 and other devices not shown. Assume that mobile device 130 sends a message to LTE network 102 that is intended for mobile device 131. Those skilled in the art will appreciate that the message is encapsulated in a signaling message, such as a SIP message. Instead of automatically forwarding the message to a legacy SMSC or MMSC, PDN-GW 112 forwards the message to universal message center 104 for processing. A more detailed operation of universal message center 104 is illustrated in FIG. 2.

Figure 2:
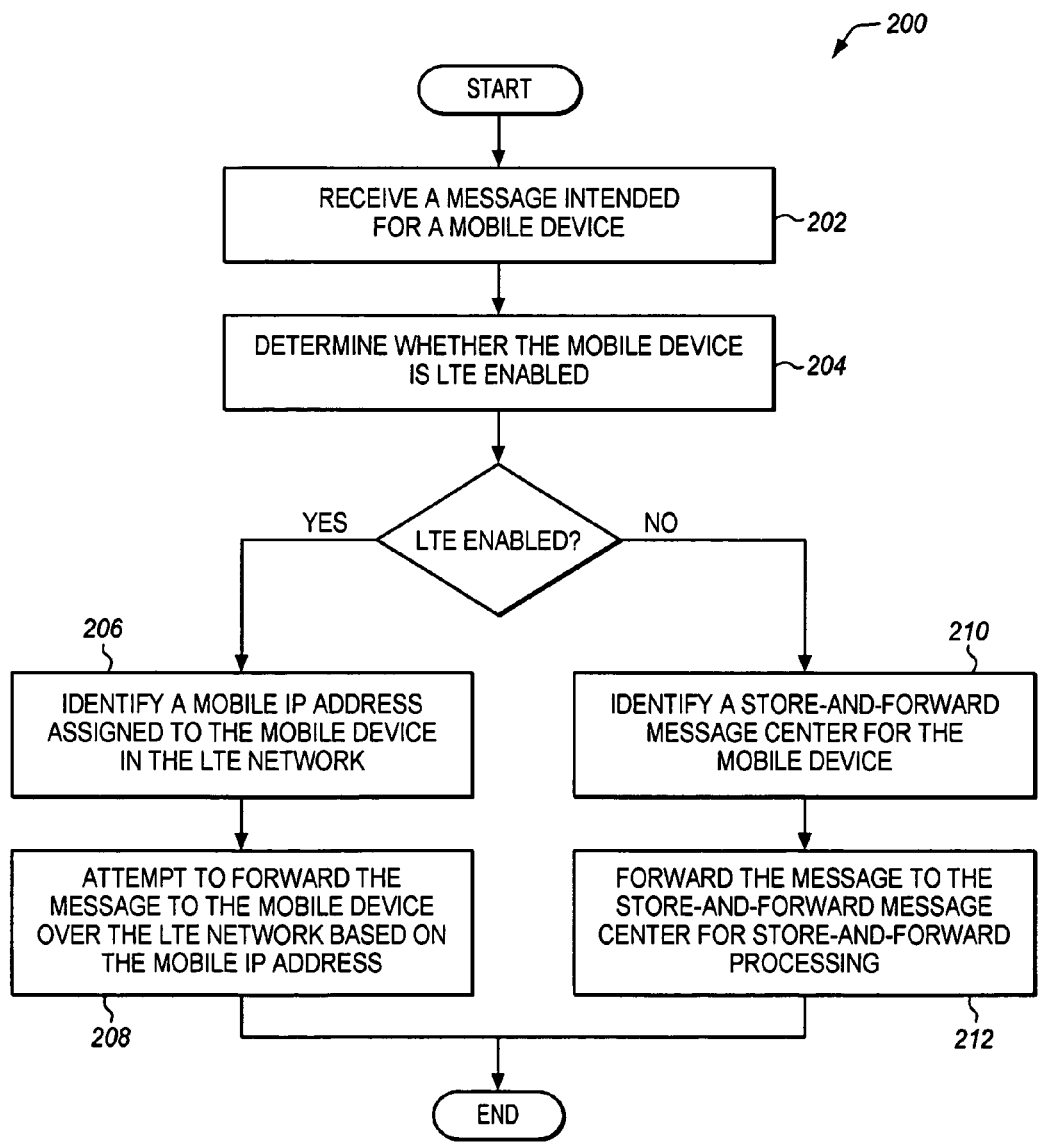
FIG. 2 is a flow chart illustrating a method of delivering messages over an LTE network in an exemplary embodiment.

FIG. 2 is a flow chart illustrating a method 200 of delivering messages over LTE network 102 in an exemplary embodiment. The steps of method 200 will be described with reference to communication network 100 in FIG. 1, but those skilled in the art will appreciate that method 200 may be performed in other networks and systems. The steps of the flow charts described herein are not all inclusive and may include other steps not shown. The steps may also be performed in an alternative order.

In step 202, control system 122 receives the message intended for mobile device 131. The message comprises a text message in this embodiment. The term "text message" is defined as a short message that includes text, but is also extended to a message that includes multimedia data, such as an image, video, and sound content. Some examples of a "text message" include an SMS message, an MMS message, or an Instant Message (IM). In other embodiments, the message may comprise an email or another type of data message.

In step 204, control system 122 determines if mobile device 131 is LTE enabled. To be considered LTE enabled, mobile device 131 includes applications or functions that allow mobile device 131 to communicate with LTE network 102. This includes the functions of registering and deregistering with LTE network 102. Control system 122 may maintain a local database that is provisioned by the service provider with indicators of mobile devices that are LTE enabled. The mobile devices may be indexed in the local database according to an International Mobile Subscriber Identity (IMSI) or some other identifier. Alternatively, control system 122 may query subscriber database 106 to determine if mobile device 131 is LTE enabled. Control system 122 may additionally determine whether mobile device 131 is served by the same service provider as mobile device 130 in step 204.

Responsive to a determination that mobile device 131 is LTE enabled, control system 122 identifies a mobile IP address assigned to mobile device 131 in LTE network 102 in step 206. There are a variety of ways that control system 122 is able to identify a mobile IP address assigned to mobile device 131. In one example, control system 122 may query subscriber database 106 for the mobile IP address, which is further illustrated in FIG. 3. In another example, control system 122 may query PDN-GW 112 for the mobile IP address, which is further illustrated in FIG. 4. When the mobile IP address is identified, delivery system 124 attempts to forward the message to mobile device 131 over LTE network 102 based on the mobile IP address in step 208.

Responsive to a determination that mobile device 131 is not LTE enabled, control system 122 identifies SFD message center 108 for mobile device 130 in step 210. For example, control system 122 may process a pre-defined routing table based on a directory number for mobile device 130 or a network address to identify SFD message center 108 for mobile device 130. Control system 122 may alternatively query subscriber database 106. Control system 122 then forwards the message to SFD message center 108 for store-and-forward processing in step 212. In response to receiving the message, SFD message center 108 stores (persistently) the message in memory. SFD message center 108 then attempts delivery of the message to mobile device 131. If the first delivery attempt is unsuccessful, then delivery is retried after a time period (e.g., 10 minutes, 30 minutes, etc). A predefined number of retries are performed before the message is discarded.

When delivery system 124 attempts to forward the message to mobile device 131 (in step 208), delivery system 134 may attempt to forward the message to mobile device 131 using FDA processing. If a first delivery attempt fails using FDA processing, then delivery system 122 identifies SFD message center 108 for mobile device 130, and forwards the message to SFD message center 108 for store-and-forward processing.

By implementing universal message center 104 in communication network 100, messages may be advantageously delivered to mobile devices 130-131 over LTE network 102. Universal message center 104 is able to deliver the messages by identifying a mobile IP address for mobile devices 130-131. When the mobile IP address is identified, universal message center 104 can advantageously attempt delivery of the messages without first forwarding the messages to a store-and-forward message center, such as a legacy SMSC/MMSC. Thus, some of the message traffic may be offloaded from the legacy SMSCs/MMSCs.

Figure 3:
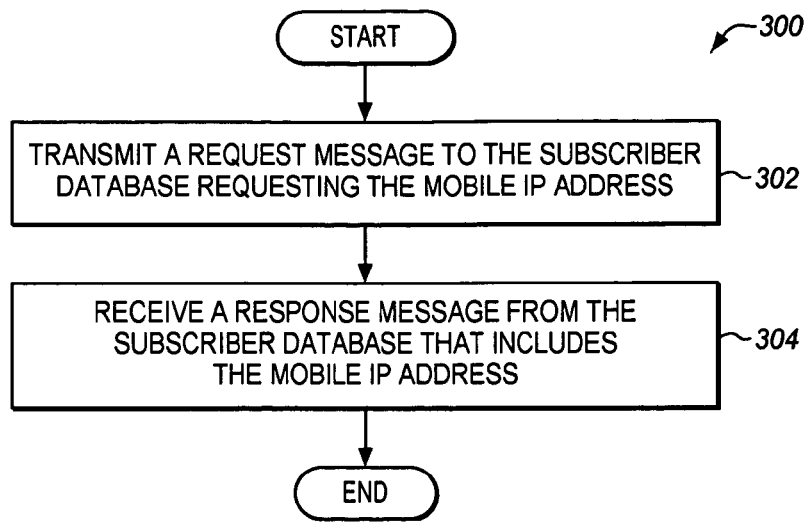
FIG. 3 is a flow chart illustrating a method of identifying a mobile IP address assigned to a mobile device in an LTE network in an exemplary embodiment.

FIG. 3 is a flow chart illustrating a method 300 of identifying a mobile IP address assigned to mobile device 131 in LTE network 102 (see step 206 in FIG. 2) in an exemplary embodiment. For method 300, control system 122 may query subscriber database 106, such as an HSS, to identify the mobile IP address assigned to mobile device 131. For the query, control system 122 transmits a request message to subscriber database 106 requesting the mobile IP address in step 302. The request message includes an identifier for mobile device 131, such as its static IP address or IMSI. The interface between universal message center 104 and subscriber database 106 may comprise a Diameter Sh interface, such as if subscriber database 106 comprises an HSS. Thus, the request message may comprise a Diameter Sh User Data Request (UDR).

In response to the request message, subscriber database 106 identifies the subscriber profile for mobile device 131, which includes the mobile IP address. The mobile IP address is not typically included in the subscriber profile according to the 3GPP/3GPP2 specifications. Thus, a new field is defined in the subscriber profile for the mobile IP address. This new field is populated by elements in LTE network 102, such as by PDN-GW 112. One example of populating an HSS with the mobile IP address is illustrated in FIG. 6.

In step 304 of FIG. 3, control system 122 receives the response message from subscriber database 106 that includes the mobile IP address. The response message may comprise a Diameter Sh User Data Answer (UDA). According to this embodiment, the response message (e.g., UDA) includes an attribute value pair (AVP) defined for the mobile IP address. This is a new AVP that is not presently defined in the Diameter Sh protocol.

Figure 4:
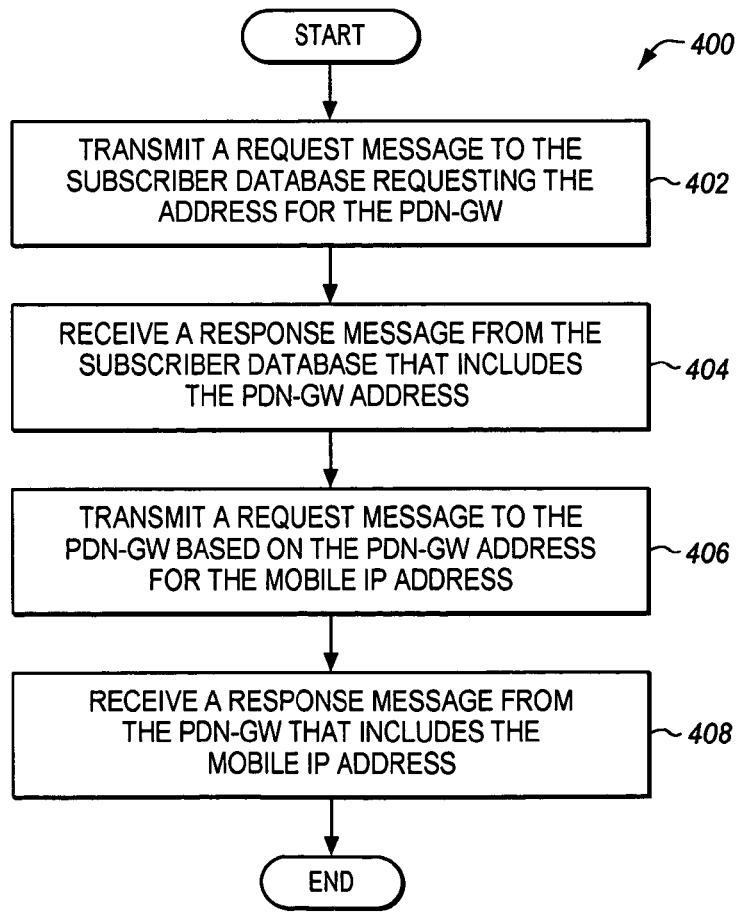
FIG. 4 is a flow chart illustrating another method of identifying a mobile IP address assigned to a mobile device in an LTE network in an exemplary embodiment.

FIG. 4 is a flow chart illustrating another method 400 of identifying a mobile IP address assigned to mobile device 131 in LTE network 102 (see step 206 in FIG. 2) in an exemplary embodiment. For method 400, control system 122 may query subscriber database 106 to identify an address for PDN-GW 112. In this embodiment, PDN-GW 112 stores the mobile IP address for mobile device 131 instead of subscriber database 106. For the query, control system 122 transmits a request message (e.g., Diameter Sh UDR) to subscriber database 106 requesting the address for PDN-GW 112 in step 402. The request message includes an identifier for mobile device 131, such as its static IP address or IMSI.

In response to the request message, subscriber database 106 identifies the PDN-GW 112 that is serving mobile device 131, and transmits a response message (e.g., Diameter Sh UDA) back to control system 122 that includes the PDN-GW address. Control system 122 then receives the response message in step 404. Control system 122 may then query PDN-GW 112 for the mobile IP address for mobile device 131. For this query, control system 122 transmits another request message to PDN-GW 112 based on the PDN-GW address in step 406. The request is for the mobile IP address assigned to mobile device 131 that is stored within PDN-GW 112.

Because universal message center 104 has not previously been implemented or suggested in a communication network, there is no suggested interface between universal message center 104 and PDN-GW 112. As provided herein, a SIP interface may be used between universal message center 104 and PDN-GW. Thus, the request message may comprise a SIP OPTIONS that requests the mobile IP address for mobile device 131.

In response to the request message, PDN-GW 112 identifies the mobile IP address for mobile device 131. PDN-GW 112 then transmits a response message back to control system 122 with the mobile IP address of mobile device 131. The response message may comprise a SIP 200 OK. In step 408, control system 122 receives the response message from PDN-GW 112 that includes the mobile IP address. According to this embodiment, the response message includes a field defined for the mobile IP address. This is a new field that is not presently defined in a SIP interface between universal message center 104 and PDN-GW 112.

EXAMPLES

Figure 5:
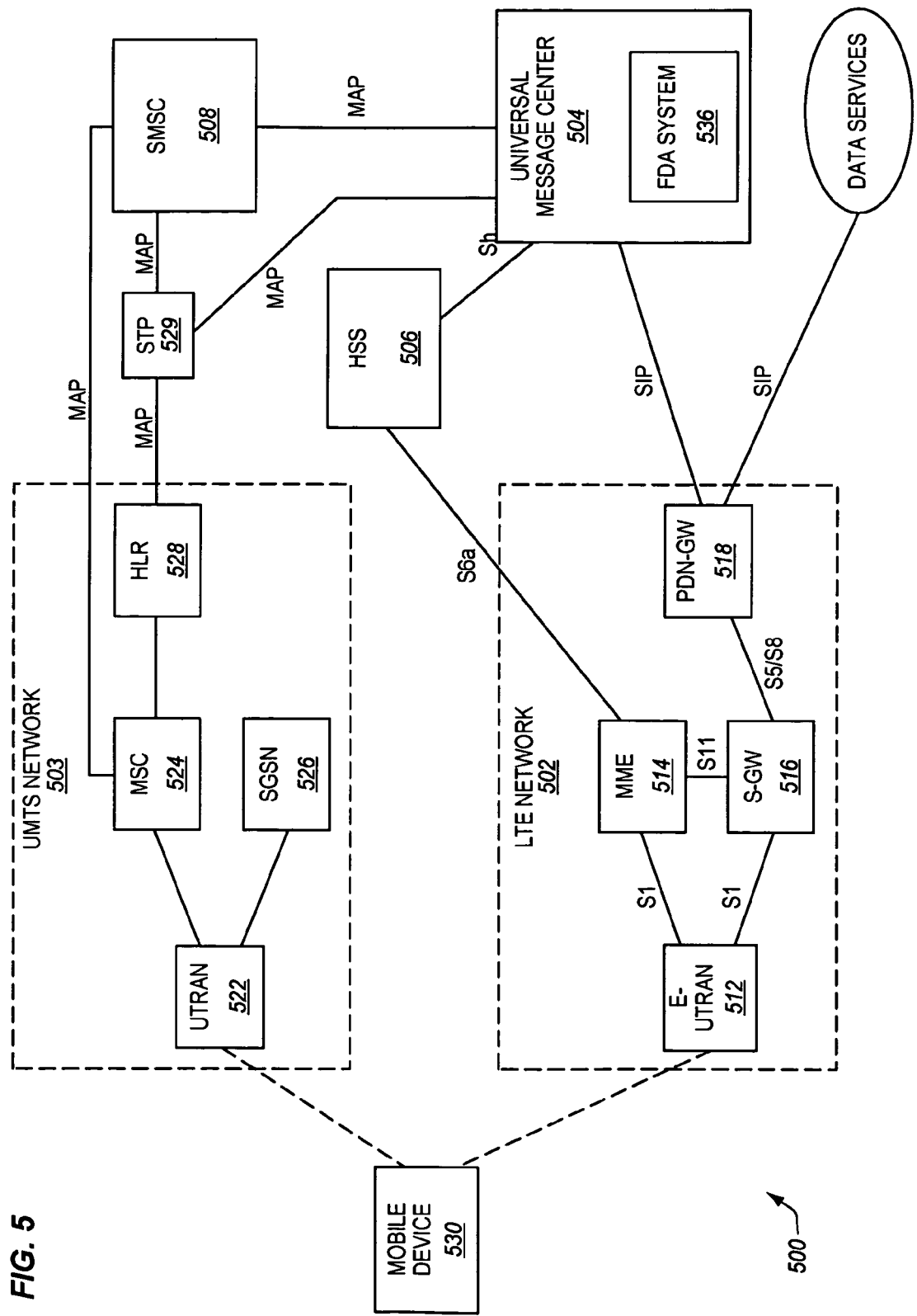
FIG. 5 illustrates another communication network in another exemplary embodiment.

FIG. 5 illustrates a communication network 500 in another exemplary embodiment.

Communication network 500 includes an LTE network 502, a UMTS network 503, a universal message center 504, a Home Subscriber Server (HSS) 506, and an SMSC 508. LTE network 502 includes an E-UTRAN 512 (evolved UTRAN), a Mobility Management Entity (MME) 514, a serving gateway (S-GW) 516, and a PDN-GW 518. UMTS network 503 includes a UTRAN 522, a Mobile Switching Center (MSC) 524, a Serving GPRS Support Node (SGSN) 526, and a Home Location Register (HLR) 528. LTE network 502 and UMTS network 503 are both able to provide service to a mobile device 530.

In this architecture, universal message center 504 is a newly implemented system to deliver messages to mobile device 530 over LTE network 502. In order to deliver the messages, universal message center 504 accesses a mobile IP address for mobile device 530 from either HSS 506 or PDN-GW 518. To allow for communication between universal message center 504 and HSS 506, a Diameter Sh interface is used. The Diameter Sh interface is upgraded or modified in this embodiment to include a newly-defined attribute value pair (AVP) for the mobile IP address so that HSS 506 is able to provide the mobile IP address to universal message center 504. Similarly, to allow for communication between universal message center 504 and PDN-GW 518, a SIP interface is used. The SIP interface is upgraded or modified in this embodiment to include a newly-defined field or parameter for the mobile IP address so that PDN-GW 518 is able to provide the mobile IP address to universal message center 504.

FIG. 6 is a message diagram illustrating the registration of mobile device 530 with LTE network 502 in an exemplary embodiment. In FIG. 6, mobile device 530 transmits a register message (Attach Request) to MME 514. In response to the register message, MME 514 authenticates mobile device 530 by exchanging one or more messages as is known to those skilled in the art. MME 514 then transmits a Create Session Request message to PDN-GW 518 (via S-GW 516) to acquire the mobile IP address for mobile device 530. PDN-GW 518 is the network element that allocates dynamic IP addresses to mobile devices. Thus, PDN-GW 518 responds to MME 514 with the dynamic mobile IP address for mobile device 530. MME 514 then transmits a notify message, such as a SIP NOTIFY, to HSS 506 that includes the mobile IP address for mobile device 530. The mobile IP address may be inserted in the MIP6-Active-Info AVP of the notify message. In response to the notify message, HSS 506 stores the mobile IP address in the subscriber profile for mobile device 530. The subscriber profile maintained in HSS 506 includes a newly-defined field for the mobile IP address. HSS 506 responds back to MME 514 with a SIP 200 OK. Although SIP is used between HSS 506 and MME 514 in this embodiment, an enhanced Diameter Cx interface may be used in other embodiments.

As an alternative, FIG. 7 is a message diagram illustrating the registration of mobile device 530 with LTE network 502 in another exemplary embodiment. FIG. 7 proceeds as in FIG. 6 until PDN-GW 518 receives the Create Session request message from MME 514 via S-GW 516. Instead of responding to MME 514 with the mobile IP address of mobile device 530, PDN-GW 518 responds to MME 514 with the static IP address for mobile device 530 and its own address (referred to as a PDN-GW address). MME 514 then transmits a notify message, such as a SIP NOTIFY, to HSS 506 that includes the static IP address for mobile device 530 and the PDN-GW address. In response to the notify message, HSS 506 stores the PDN-GW address in the subscriber profile for mobile device 530. Again, the subscriber profile maintained in HSS 506 includes a newly-defined field for the PDN-GW address. HSS 506 responds back to MME 514 with a SIP 200 OK.

Figure 8:
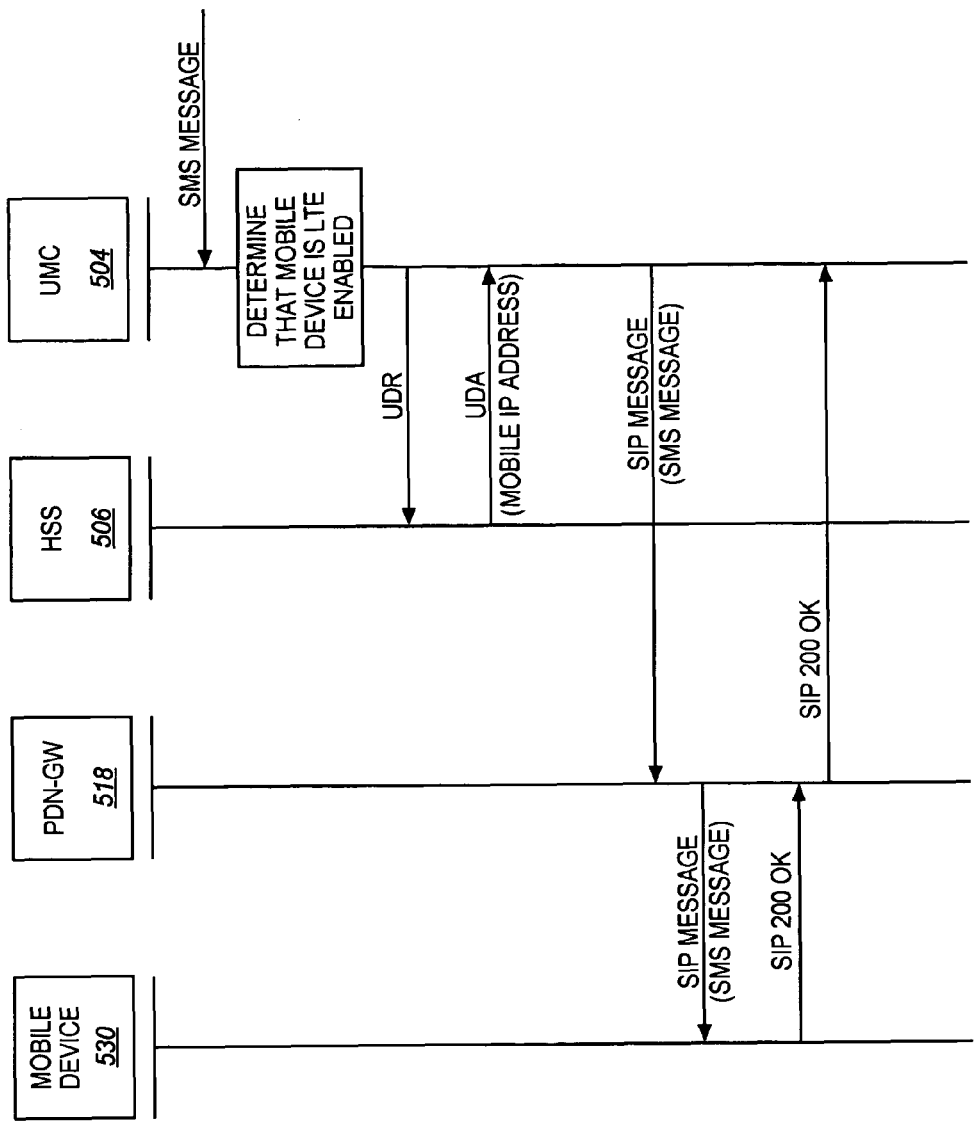
FIG. 8 is a message diagram illustrating a successful delivery of an SMS message in an exemplary embodiment.

With mobile device 530 registered, universal message center 504 may attempt to deliver SMS messages directly to mobile device 530 over LTE network 502 (without first forwarding the message to SMSC 508). FIG. 8 is a message diagram illustrating a successful delivery of an SMS message in an exemplary embodiment. Assume that universal message center (UMC) 504 receives a Mobile Terminated (MT) SMS message that is intended for a user of mobile device 530. In response to receiving the message, universal message center 504 determines that mobile device 530 is LTE enabled and within the same service provider network. Thus, universal message center 504 identifies a mobile IP address assigned to mobile device 530 in LTE network 502 by transmitting a Diameter Sh UDR to HSS 506 for the mobile IP address. In response to the UDR, HSS 506 identifies the subscriber profile associated with mobile device 530, and also identifies the mobile IP address stored in the subscriber profile. HSS 506 then transmits a Diameter Sh UDA to universal message center 504 that includes the mobile IP address. The mobile IP address is inserted in a newly-defined AVP of the Diameter Sh UDA. When the mobile IP address is identified, universal message center 504 attempts to forward the SMS message to mobile device 530 over LTE network 502 (through PDN-GW 518) based on the mobile IP address. More specifically, universal message center 504 forwards a SIP MESSAGE to PDN-GW 518 that includes the SMS message, and PDN-GW 518 forwards the SIP MESSAGE to mobile device 530 over a signaling channel of E-UTRAN 512 (see also FIG. 5). Universal message center 504 uses FDA system 536 for the first delivery attempt of the SMS message. Thus, universal message center 504 attempts delivery first before storing the SMS message, such as in SMSC 508. If the delivery attempt is successful, then mobile device 530 transmits a SIP 200 OK to PDN-GW 518, which in turn sends a 200 OK to universal message center 504.

Figure 9:
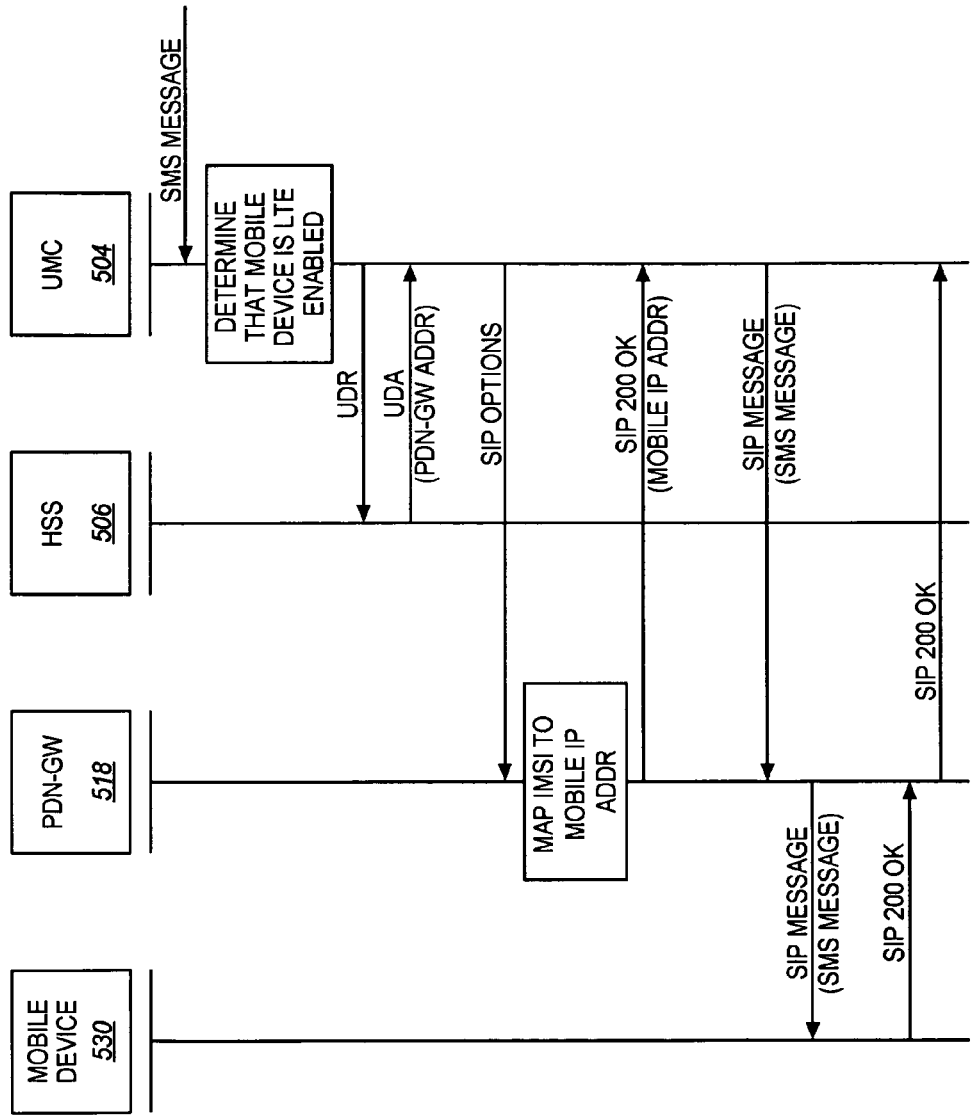
FIG. 9 is a message diagram illustrating another successful delivery of an SMS message in an exemplary embodiment.

In FIG. 8, universal message center 504 is able to query HSS 506 to acquire the mobile IP address for mobile device 530 (see registration in FIG. 6). Universal message center 504 may alternatively query PDN-GW 518 to acquire the mobile IP address for mobile device 530 (see registration in FIG. 7). FIG. 9 is a message diagram illustrating another successful delivery of an SMS message in an exemplary embodiment. Assume again that universal message center (UMC) 504 receives a Mobile Terminated (MT) SMS message that is intended for a user of mobile device 530. In response to receiving the message, universal message center 504 determines that mobile device 530 is LTE enabled and within the same service provider network. Thus, universal message center 504 identifies a mobile IP address assigned to mobile device 530 in LTE network 502 by first transmitting a Diameter Sh UDR to HSS 506 for the address of PDN-GW 518. In response to the UDR, HSS 506 identifies the subscriber profile associated with mobile device 530, and also identifies the PDN-GW address stored in the subscriber profile. HSS 506 then transmits a Diameter Sh UDA to universal message center 504 that includes the PDN-GW address.

Next, universal message center 504 transmits a SIP OPTIONS to PDN-GW 518 requesting the mobile IP address of mobile device 530. In response to the SIP OPTIONS, PDN-GW 518 identifies the mobile IP address stored for mobile device 530. PDN-GW 518 then transmits a SIP 200 OK to universal message center 504 that includes the mobile IP address. The mobile IP address is inserted in a newly-defined field of the SIP 200 OK. When the mobile IP address is identified, universal message center 504 attempts to forward the message to mobile device 530 over LTE network 502 (through PDN-GW 518) based on the mobile IP address again using FDA system 536. More specifically, universal message center 504 forwards a SIP MESSAGE to PDN-GW 518 that includes the SMS message, and PDN-GW 518 forwards the SIP MESSAGE to mobile device 530 over a signaling channel of E-UTRAN 512 (see also FIG. 5). If the delivery attempt is successful, then mobile device 530 transmits a SIP 200 OK to PDN-GW 518, which in turn sends a 200 OK to universal message center 504.

Figure 10:
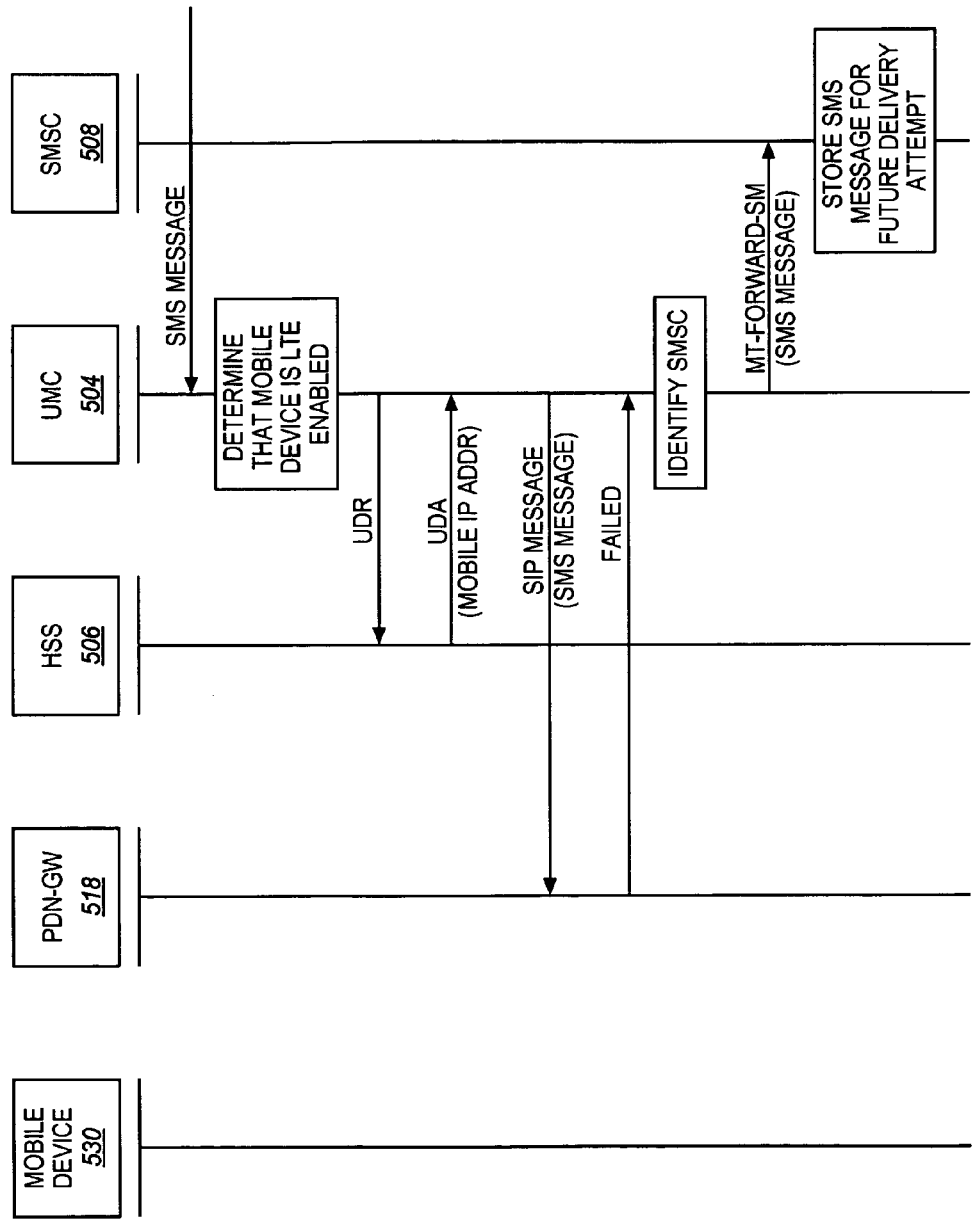
FIG. 10 is a message diagram illustrating a failed delivery of an SMS message in an exemplary embodiment.

FIG. 10 is a message diagram illustrating a failed delivery of an SMS message in an exemplary embodiment. The message diagram in FIG. 10 is similar to FIG. 8 until universal message center 504 attempts to forward the message to mobile device 530 over LTE network 502. In this embodiment, the delivery attempt failed. In response to identifying the delivery failure, universal message center (UMC) 504 identifies the SMSC 508 for the originator of the SMS message. For example, universal message center 504 may identify the SMSC 508 based on locally provisioned data or by querying HSS 506. Universal message center 504 then forwards the SMS message to the identified SMSC 508 by sending a MAP MT Forward Short Message (a MAP MT-Forward-SM) to SMSC 508. SMSC 508 then stores the SMS message, and initiates further delivery attempts using store-and-forward processing. SMSC 508 attempts to deliver the SMS message to mobile device 530 over UMTS network 503.

In another embodiment of a failed delivery, universal message center 504 may query HSS 506 for the PDN-GW address instead of the mobile IP address, much as is shown in FIG. 9.

Figure 11:
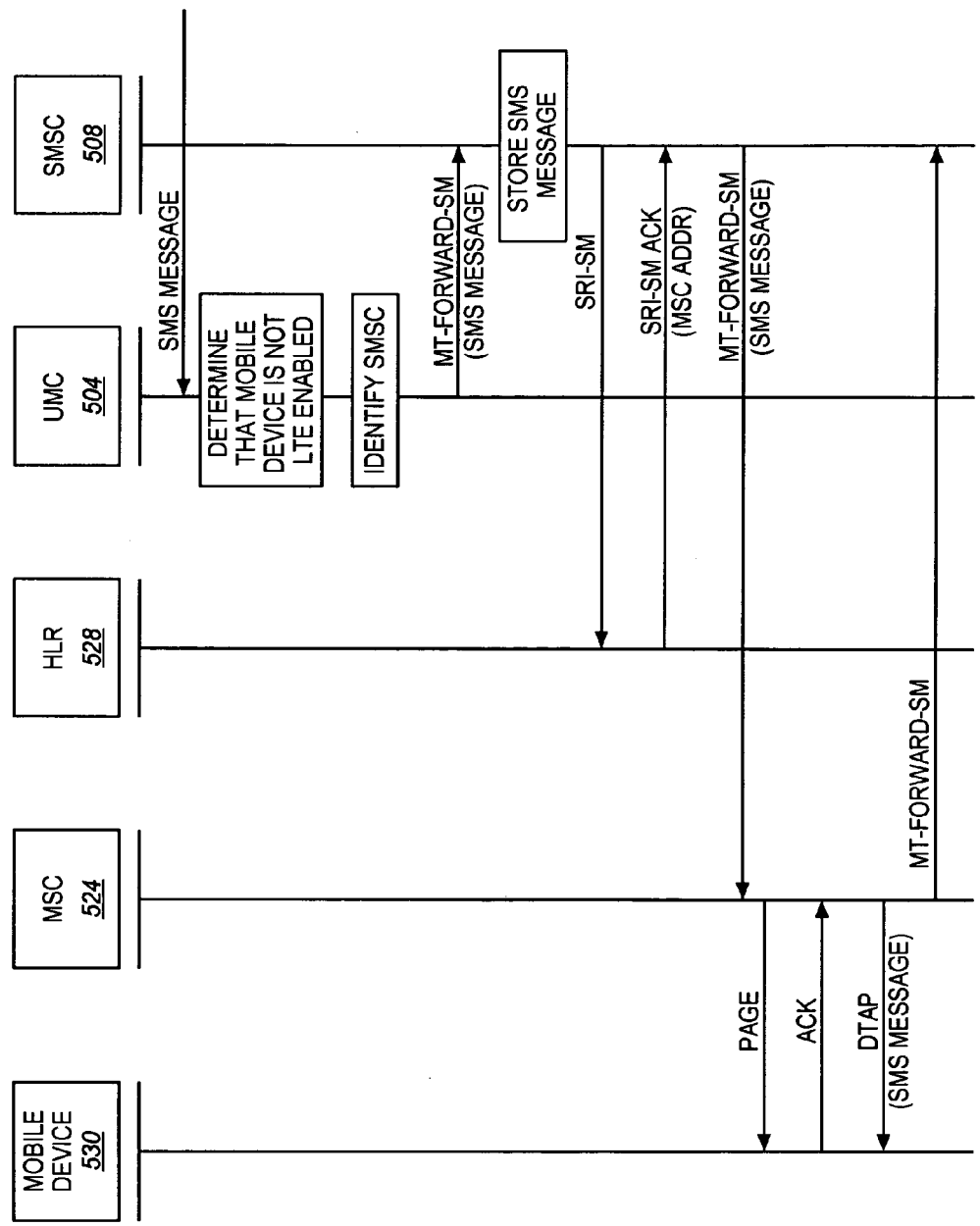
FIG. 11 is a message diagram illustrating delivery of an SMS message to a mobile device that is not LTE enabled in an exemplary embodiment.

FIG. 11 is a message diagram illustrating delivery of an SMS message to a mobile device that is not LTE enabled in an exemplary embodiment. Assume again that universal message center (UMC) 504 receives a Mobile Terminated (MT) SMS message that is intended for a user of mobile device 530. In response to receiving the message, universal message center 504 determines that mobile device 530 is not LTE enabled. Thus, universal message center 504 identifies the SMSC 508 for the originator of the SMS message, and forwards the SMS message to the identified SMSC 508 by sending a MAP MT Forward Short Message (a MAP MT-Forward-SM) to SMSC 508. SMSC 508 then stores the SMS message, and initiates delivery attempts over UMTS network 503 using store-and-forward processing. SMSC 508 transmits a MAP Send Routing Information for Short Message (SRI-SM) to HLR 528 requesting the present location of mobile device 530 through STP 529. HLR 528 identifies the MSC 524 that is serving mobile device 530, and transmits an SRI-SM acknowledgement to SMSC 508 that includes the MSC address. SMSC 508 then attempts to deliver the SMS message by sending an MT-Forward-SM message to MSC 524 based on the MSC address. In response to the MT-Forward-SM message, MSC 524 pages mobile device 530. If mobile device 530 acknowledges the page, then MSC 524 sends the SMS message to mobile device 530 using the Direct Transfer Application Part (DTAP) carried in an SCCP connection over the air interface of UTRAN 522 (see also FIG. 5). If the first delivery attempt is successful, then MSC 524 sends an MT-Forward-SM response to SMSC 508 indicating a successful delivery of the SMS message. If the first delivery attempt is unsuccessful, then SMSC 508 will initiate a retry after a pre-defined time interval.

Figure 12:
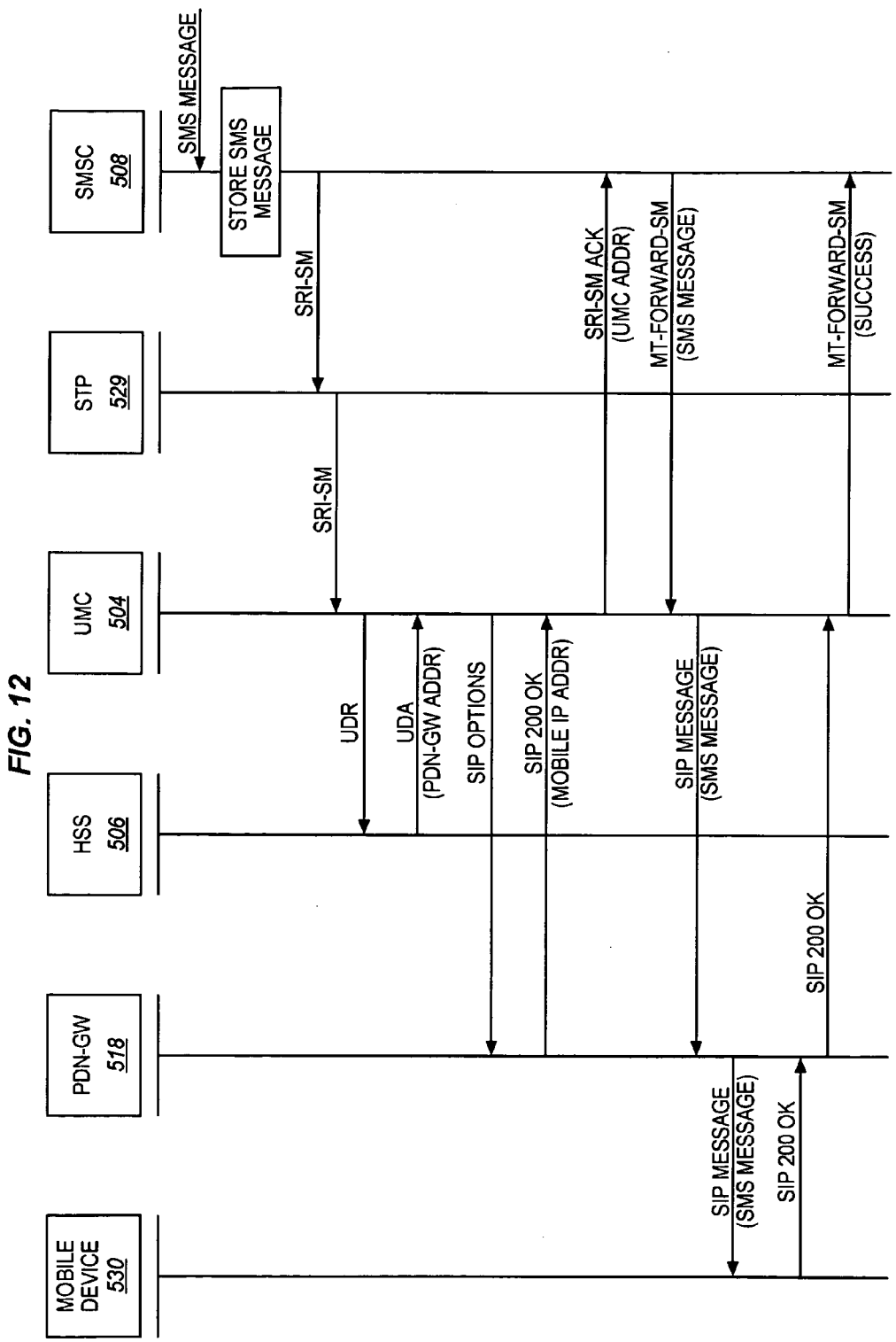
FIGS. 12-13 are message diagrams illustrating a successful delivery of an SMS message from an SMSC in an exemplary embodiment.

In the embodiments of FIGS. 8-11, the originator of the SMS message was assumed to be a subscriber to an LTE network. Thus, universal message center 504 receives the SMS message first before the SMS message is ever sent to SMSC 508. If the originator of the SMS message is not an LTE subscriber, then the SMS message is first forwarded to SMSC 508. FIG. 12 is a message diagram illustrating a successful delivery of an SMS message from an SMSC in an exemplary embodiment. Assume that SMSC 508 receives a Mobile Terminated (MT) SMS message that is intended for a user of mobile device 530. In response to receiving the SMS message, SMSC 508 needs to discover the location of mobile device 530. To do this, SMSC 508 transmits a MAP Send Routing Information for Short Message (SRI-SM) to HLR 528 requesting the present location of mobile device 530 through STP 529 (see also FIG. 5). In this embodiment, STP 529, which is located between SMSC 508 and HLR 528, intercepts the MAP SRI-SM from SMSC 508. STP 529 replaces the HLR point code in the MAP SRI-SM with a point code for universal message center 504. Thus, the MAP SRI-SM is routed to universal message center 504 instead of HLR 528.

In response to receiving the MAP SRI-SM, universal message center 504 transmits a UDR to HSS 506 for a PDN-GW address for PDN-GW 518, and an International Mobile Subscriber Identity (IMSI) for mobile device 530, which is a unique number associated with all UMTS mobile devices. HSS 506 processes the subscriber profile for mobile device 530, and responds with a UDA that includes the PDN-GW address and the IMSI. Next, universal message center 504 transmits a SIP OPTIONS to PDN-GW 518 requesting the mobile IP address of mobile device 530. In response to the SIP OPTIONS, PDN-GW 518 identifies the mobile IP address stored for mobile device 530. PDN-GW 518 then transmits a SIP 200 OK to universal message center 504 that includes the mobile IP address.

Those skilled in the art will appreciate that universal message center 504 may query HSS 506 for the mobile IP address directly if HSS 506 stores the mobile IP address in a subscriber profile for mobile device 530. In this scenario, the query to PDN-GW 518 is not needed, which is shown in FIG. 13.

Figure 13:
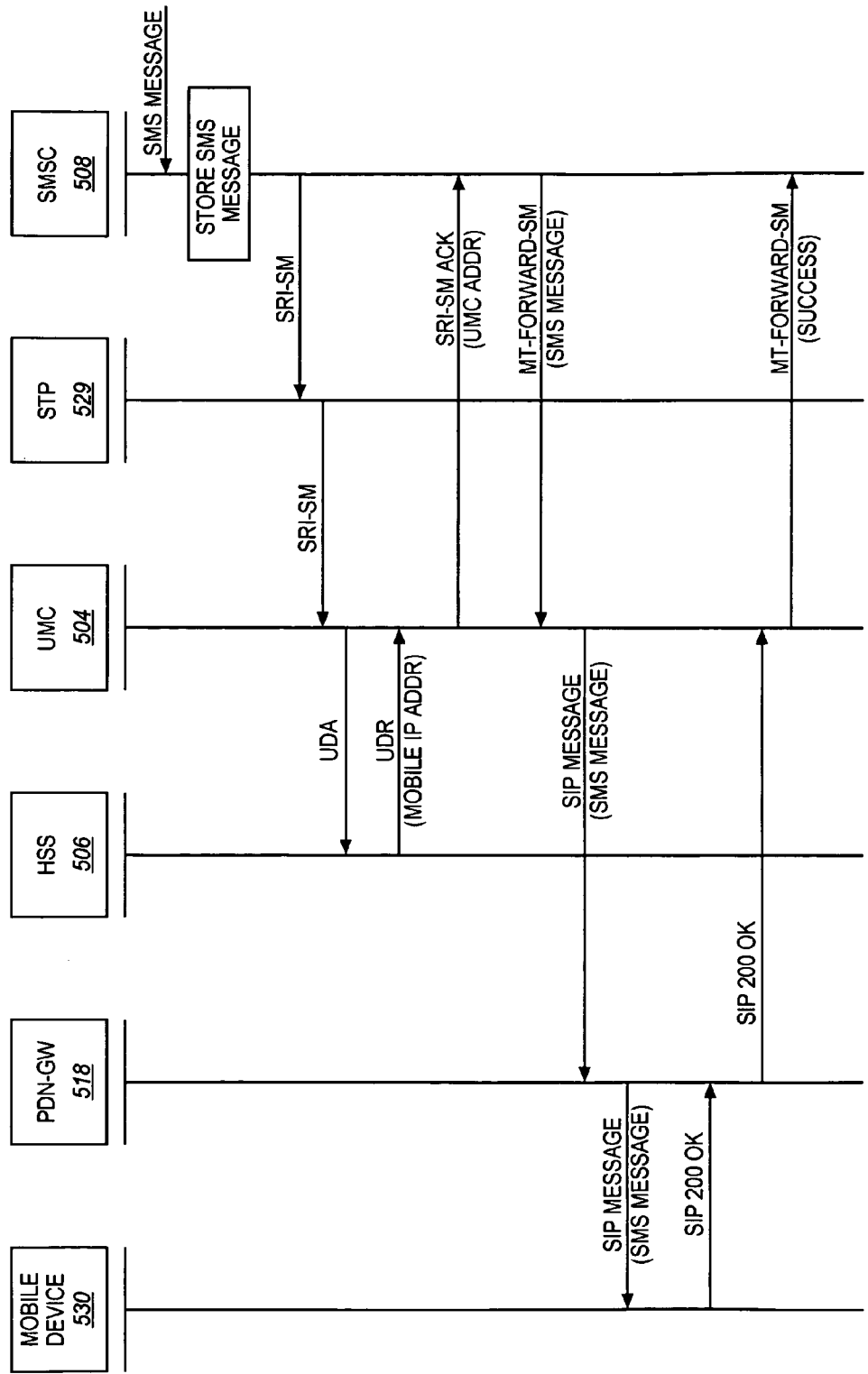

In FIG. 12 or 13, universal message center 504 maintains a database (keyed by IMSI/MSIDN) with the last seen PDN address, PDN-GW address, and recent delivery failure counts. If the query to acquire the mobile IP address is successful, then universal message center 504 determines that mobile device 530 is LTE enabled (i.e., registered with LTE network 502). Universal message center 504 then inserts its own address (i.e., E.164 address) in the SRI-SM acknowledgement in place of the address for the serving MSC 524 as the routing information, and sends the SRI-SM acknowledgement to SMSC 508.

In response to the SRI-SM acknowledgement, SMSC 508 attempts to deliver the SMS message to mobile device 530. To do so, SMSC 508 sends a MAP MT Forward Short Message (a MAP MT-Forward-SM) to the address returned in the SRI-SM acknowledgement, which is the E.164 address of universal message center 504. Thus, SMSC 508 forwards the SMS message to universal message center 504 in the MT-Forward-SM. Universal message center 504 then generates a SIP MESSAGE from the MT-Forward-SM that includes the SMS message, and attempts to send the SIP MESSAGE to mobile device 530 via PDN-GW 518 using FDA processing. If the delivery attempt is successful, then mobile device 530 transmits a SIP 200 OK to PDN-GW 518, which in turn sends a 200 OK to universal message center 504. Universal message center 504 sends an MT-Forward-SM response to SMSC 508 indicating a successful delivery of the SMS message.

Message delivery as in FIGS. 12-13 provides many advantages. First, message delivery is performed over LTE network 502 instead of UMTS network 503, which saves resources in UMTS network 503, such as MSC 524. Because universal message center 504 uses FDA processing, there is no need for a large storage facility within universal message center 504. And because universal message center 504 supports a legacy SMSC interface, no changes are required in SMSC 508 to allow for delivery of SMS messages over LTE network 502.

Figure 14:
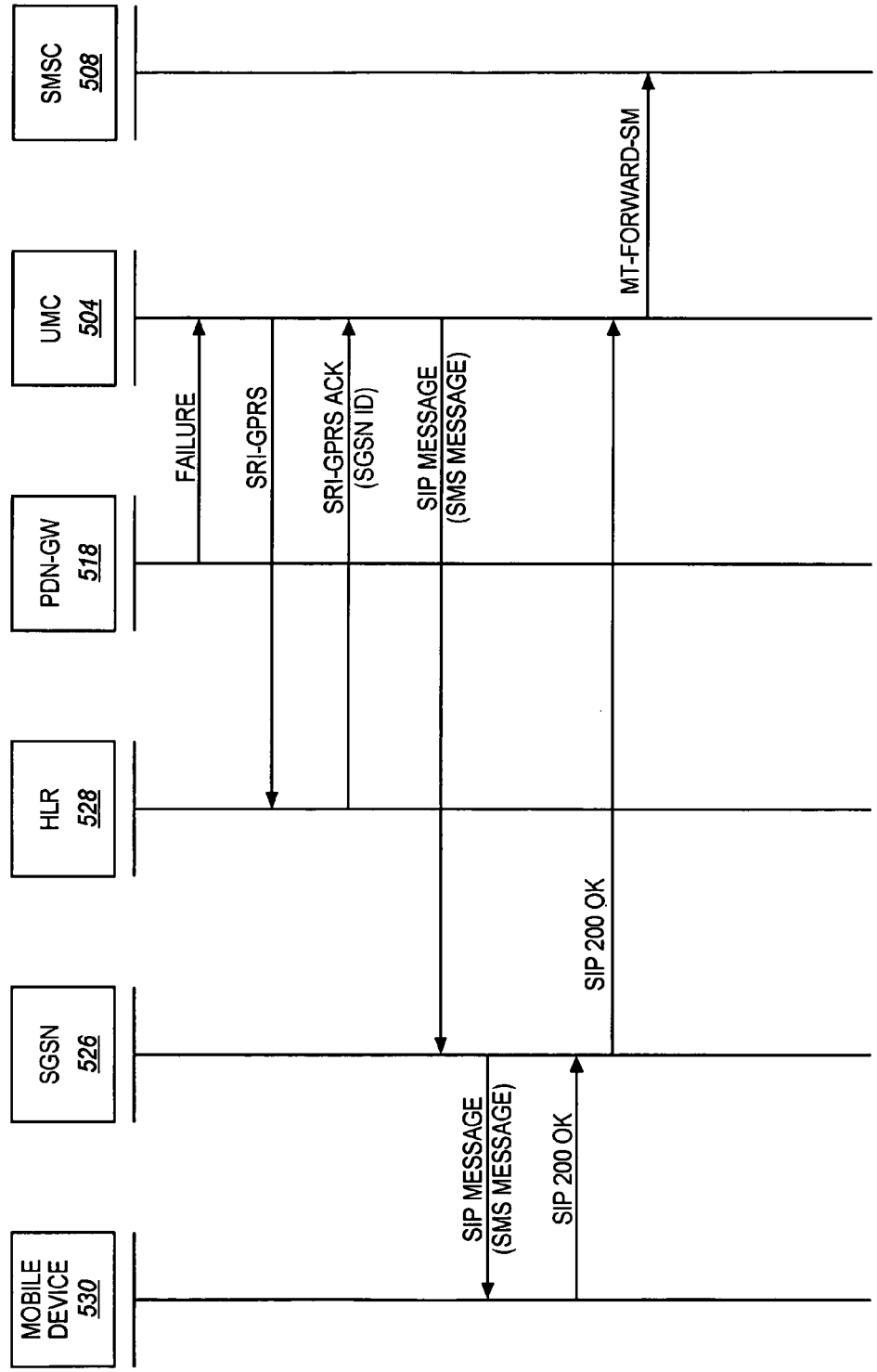
FIG. 14 is a message diagram illustrating a failed delivery of an SMS message from an SMSC in an exemplary embodiment.

FIG. 14 is a message diagram illustrating a failed delivery of an SMS message from an SMSC in an exemplary embodiment. In this embodiment, universal message center (UMC) 504 switches over to the UMTS data network (SGSN) for message delivery if delivery fails on LTE network 502. Assume that a delivery attempt is performed as in FIG. 12 or 13. However, universal message center (UMC) 504 receives an indication that message delivery failed. In response to identifying the delivery failure, universal message center (UMC) 504 switches over to UMTS network 503 for message delivery. To do so, universal message center 504 sends an SRI-GPRS to HLR 528. For registered devices, HLR 528 returns an identifier or address for SGSN 526 in an SRI-GPRS acknowledgement. Universal message center 504 then sends the SIP MESSAGE to SGSN 526 based on the SGSN ID, and SGSN 526 delivers the SIP MESSAGE to mobile device 530 over UMTS network 530. If delivery is successful, then mobile device 530 transmits a SIP 200 OK to SGSN 526, which in turn sends a 200 OK to universal message center 504. Universal message center 504 then sends an MT-Forward-SM response to SMSC 508 indicating a successful delivery of the SMS message.

Figure 15:
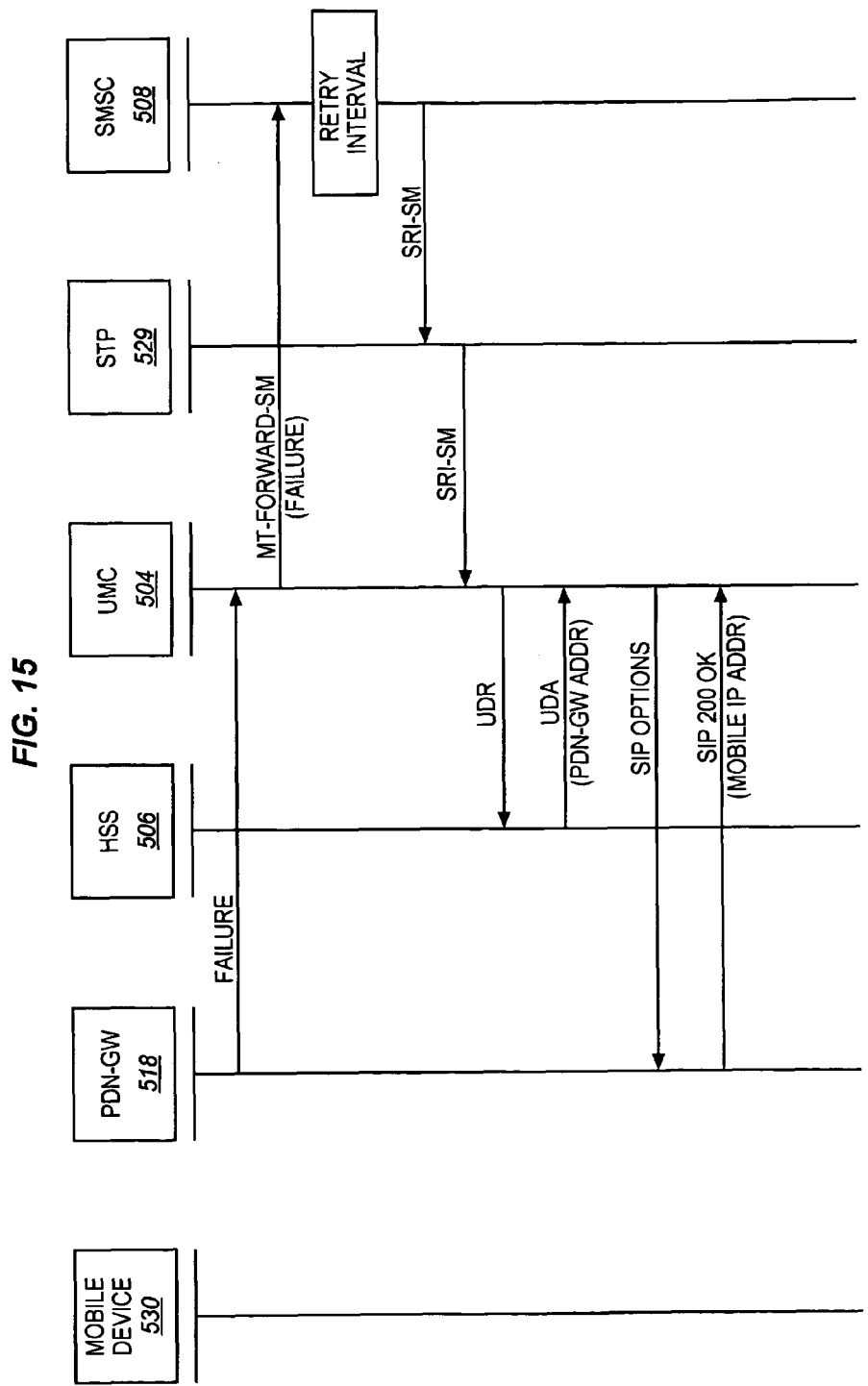
FIGS. 15-16 are message diagrams illustrating another failed delivery of an SMS message from an SMSC in an exemplary embodiment.
Figure 16:
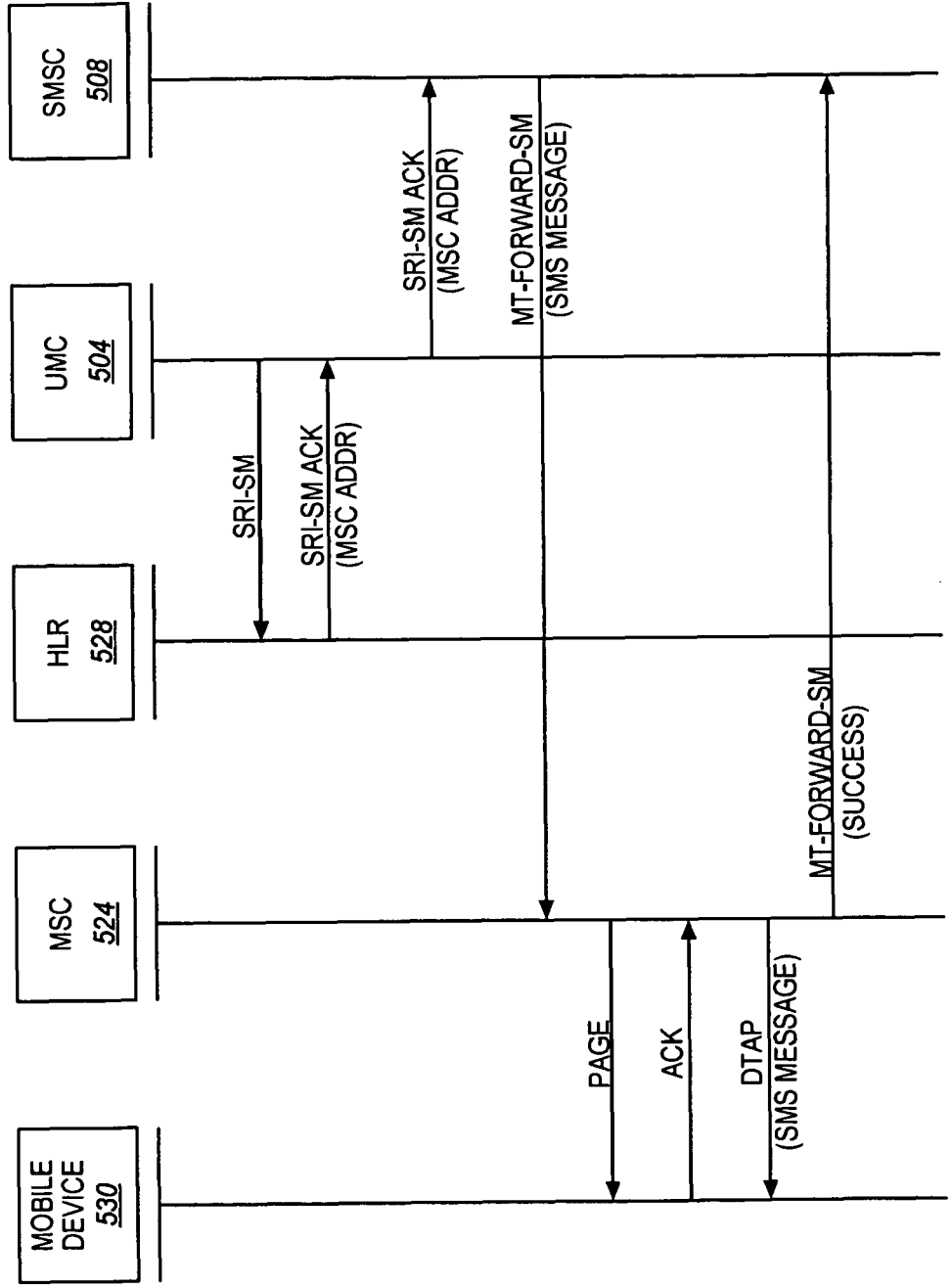

FIGS. 15-16 are message diagrams illustrating another failed delivery of an SMS message from an SMSC in an exemplary embodiment. In this embodiment, universal message center (UMC) 504 switches over to the UMTS voice network (MSC) for message delivery if delivery fails on LTE network 502. Assume that a delivery attempt is performed as in FIG. 12 or 13. However, universal message center (UMC) 504 receives an indication in FIG. 15 that message delivery failed. In response to identifying the delivery failure, universal message center 504 switches over to UMTS network 503 for message delivery. To do so, universal message center 504 sends an MT-Forward-SM with a failure indication to SMSC 508. SMSC 508 retries message delivery after a time interval. When the time interval expires, SMSC 508 again transmits a MAP SRI-SM to HLR 528 through STP 529 requesting the present location of mobile device 530. STP 529 intercepts the MAP SRI-SM from SMSC 508, and replaces the HLR point code in the MAP SRI-SM with a point code for universal message center 504. Thus, the MAP SRI-SM is again routed to universal message center 504 instead of HLR 528. In response to receiving the MAP SRI-SM, universal message center 504 transmits a UDR to HSS 506 requesting a PDN-GW address for PDN-GW 518. HSS 506 identifies the PDN-GW address, and sends a SIP 200 OK back to universal message center 504 that includes the PDN-GW address. Universal message center 504 then transmits a SIP OPTIONS to PDN-GW 518 requesting the mobile IP address of mobile device 530. In response to the SIP OPTIONS, PDN-GW 518 identifies the mobile IP address stored for mobile device 530. PDN-GW 518 then transmits a SIP 200 OK to universal message center 504 that includes the mobile IP address.

Those skilled in the art will appreciate that universal message center 504 may query HSS 506 for the mobile IP address directly if HSS 506 stores the mobile IP address in a subscriber profile for mobile device 530. In this scenario, the query to PDN-GW 518 is not needed.

In FIG. 16, universal message center 504 determines whether to attempt LTE delivery again based on a change in PDN-GW address, a change in the mobile IP address, or an LTE Retry-Timer. This scenario assumes no change in the PDN-GW address or the mobile IP address, and the LTE retry-timer has not expired. Thus, universal message center 504 transmits an SRI-SM to HLR 528 through STP 529 requesting the present location of mobile device 530 (CgPA=UMC E.164). HLR 528 performs a database lookup to retrieve the present location of mobile device 530, and returns an SRI-SM acknowledgement to universal message center 504 indicating the present location of mobile device 530. The present location may be the address of the MSC 524 (MSC ADDR) that is serving mobile device 530. Universal message center 504 then transmits and SRI-SM acknowledgment to SMSC 508 indicating the address (or ID) for MSC 528. This SRI-SM acknowledgment resembles the SRI-SM acknowledgment that SMSC 508 would receive from HLR 528 responsive to a SRI-SM. Thus, SMSC 508 attempts to deliver the SMS message by sending an MT-Forward-SM message to MSC 524. MSC 524 then pages mobile device 530. If mobile device 530 acknowledges the page, then MSC 524 sends the SMS message to mobile device 530 using the Direct Transfer Application Part (DTAP) carried in an SCCP connection over the air interface of UTRAN 522 (see also FIG. 5). If delivery is successful, then MSC 524 sends an MT-Forward-SM response to SMSC 508 indicating a successful delivery of the SMS message.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system universal comprising:
a universal message center operable to deliver messages over a Long Term Evolution (LTE) network, the universal message center comprising:
a control system operable to receive a text message intended for a destination mobile device, to determine if the destination mobile device is LTE enabled responsive to receiving the text message, and to identify a mobile IP address assigned to the destination mobile device in the LTE network responsive to a determination that the destination mobile device is LTE enabled;
a delivery system operable to attempt to forward the text message to the destination mobile device over the LTE network based on the mobile IP address,
wherein the control system is further operable to identify a store-and-forward (SFD) message center for an originator of the text message responsive to a determination that the destination mobile device is not LTE enabled, and to forward the text message to the SFD message center for store-and-forward processing.

2. The system of claim 1 wherein:
the control system is further operable to query a subscriber database that stores a subscriber profile for the destination mobile device to identify the mobile IP address assigned to the destination mobile device; and
the interface between the control system and the subscriber database is a Diameter Sh interface, and an attribute value pair (AVP) is defined in the Diameter Sh interface for the mobile IP address.

3. The system of claim 1 wherein:
the control system is further operable to query a subscriber database that stores a subscriber profile for the destination mobile device to identify a Packet Data Network Gateway (PDN-GW) address for a PDN-GW, and to query the PDN-GW based on the PDN-GW address to identify the mobile IP address assigned to the destination mobile device.

4. The system of claim 3 wherein:
the control system is further operable to communicate with the PDN-GW over a SIP interface, wherein a field is defined in the SIP interface for the mobile IP address.

5. The system of claim 1 wherein:
the delivery system is further operable to forward the text message using First Delivery Attempt (FDA) processing.

6. The system of claim 5 wherein:
if a first delivery attempt fails using FDA processing, then the control system is further operable to identify the SFD message center for the originator of the text message, and to forward the text message to the SFD message center for store-and-forward processing.

7. A method of delivering messages over a Long Term Evolution (LTE) network, the method comprising:
receiving a text message intended for a destination mobile device;
determining if the destination mobile device is LTE enabled responsive to receiving the text message;
identifying a mobile IP address assigned to the destination mobile device in the LTE network responsive to a determination that the destination mobile device is LTE enabled; and
attempting to forward the text message to the destination mobile device over the LTE network based on the mobile IP address responsive to a determination that the destination mobile device is LTE enabled;
identifying a store-and-forward (SFD) message center for an originator of the text message responsive to a determination that the destination mobile device is not LTE enabled; and
forwarding the text message to the SFD message center for store-and-forward processing responsive to a determination that the destination mobile device is not LTE enabled.

8. The method of claim 7 wherein identifying a mobile IP address assigned to the destination mobile device in the LTE network comprises:
querying a subscriber database that stores a subscriber profile for the destination mobile device for the mobile IP address;
wherein the interface with the subscriber database is a Diameter Sh interface, and an attribute value pair (AVP) is defined in the Diameter Sh interface for the mobile IP address.

9. The method of claim 7 wherein identifying a mobile IP address assigned to the destination mobile device in the LTE network comprises:
querying a subscriber database that stores a subscriber profile for the destination mobile device to identify a Packet Data Network Gateway (PDN-GW) address for a PDN-GW; and
querying the PDN-GW based on the PDN-GW address for the mobile IP address.

10. The method of claim 9 wherein:
the interface with the PDN-GW is a SIP interface; and
a field is defined in the SIP interface for the mobile IP address.

11. The method of claim 7 wherein attempting to forward the text message to the destination mobile device comprises:
forwarding the text message using First Delivery Attempt (FDA) processing.

12. The method of claim 11 wherein:
if a first delivery attempt fails using FDA processing, then the method further comprises identifying the SFD message center for the originator of the text message, and forwarding the text message to the SFD message center for store-and-forward processing.

13. A communication network, comprising:
a long term evolution (LTE) network; and
a universal message center operable to receive a message intended for a destination mobile device, to determine if the destination mobile device is LTE enabled responsive to receiving the text message, to identify a mobile IP address assigned to the destination mobile device in the LTE network responsive to a determination that the destination mobile device is LTE enabled, and to attempt to forward the message to the destination mobile device over the LTE network based on the mobile IP address using First Delivery Attempt (FDA) processing;
the universal message center further operable to identify a store-and-forward (SFD) message center for an originator of the message responsive to a determination that the destination mobile device is not LTE enabled, and to forward the message to the SFD message center for store-and-forward processing.

14. The communication network of claim 13 further comprising:
a Home Subscriber Server (HSS) operable to store a subscriber profile for the destination mobile device that includes a field defined for the mobile IP address assigned to the destination mobile device in the LTE network.

15. The communication network of claim 14 wherein:
the LTE network includes a Packet Data Network Gateway (PDN-GW) and a Mobility Management Entity (MME);
the MME is operable to receive a register message from the destination mobile device, and to send a create session request to the PDN-GW;
the PDN-GW is operable to transmit the mobile IP address for the destination mobile device to the MME in response to the create session request; and
the MME is further operable to send a notify message to the HSS that includes the mobile IP address so that the HSS is able to store the mobile IP address in the subscriber profile for the destination mobile device.

16. The communication network of claim 14 wherein:
the universal message center is further operable to receive a MAP Send Routing Information for Short Message (SRI-SM) from the SFD message center requesting routing information for another message received for the destination mobile device, to query the HSS for the mobile IP address for the destination mobile device, and to transmit an SRI-SM acknowledgement to the SFD message center that includes an address for the universal message center as the routing information; and
the universal message center is further operable to receive a MAP MT Forward Short Message from the SFD message center that includes the other message, to generate a SIP MESSAGE from the MAP MT Forward Short Message that includes the other message, and to attempt to send the SIP MESSAGE to the destination mobile device over the LTE network.

17. The communication network of claim 16 wherein:
the universal message center is further operable to receive an indication that message delivery failed for the other message, to identify an address for an SGSN in a UMTS network, and to send the SIP MESSAGE to the SGSN based on the SGSN address so that the SGSN delivers the SIP MESSAGE to the destination mobile device over the UMTS network.

18. The communication network of claim 16 wherein:
the universal message center is further operable to receive an indication that message delivery failed for the other message, to identify an address for a Mobile Switching Center (MSC) in a UMTS network, and to send an SRI-SM acknowledgement to the SFD message center indicating the address for the MSC so that the SFD message center delivers the other message to the destination mobile device through the MSC.

* * * * *

UNITED STATES PATENT AND TRADEMARK OFFICE
CERTIFICATE OF CORRECTION

PATENT NO. : 8,351,964 B2
APPLICATION NO. : 12/495331
DATED : January 8, 2013
INVENTOR(S) : Cai et al.

It is certified that error appears in the above-identified patent and that said Letters Patent is hereby corrected as shown below:

In the Claims

The text in Claim 1, column 12, lines 31-50 reads,

"1. A system universal comprising:

a universal message center operable to deliver messages over a Long Term Evolution (LTE) network, the universal message center comprising:

a control system operable to receive a text message intended for a destination mobile device, to determine if the destination mobile device is LTE enabled responsive to receiving the text message, and to identify a mobile IP address assigned to the destination mobile device in the LTE network responsive to a determination that the destination mobile device is LTE enabled;

a delivery system operable to attempt to forward the text message to the destination mobile device over the LTE network based on the mobile IP address;

wherein the control system is further operable to identify a store-and-forward (SFD) message center for an originator of the text message responsive to a determination that the destination mobile device is not LTE enabled, and to forward the text message to the SFD message center for store-and-forward processing."

should read

-- 1. A system comprising:

a universal message center operable to deliver messages over a Long Term Evolution (LTE) network, the universal message center comprising:

Signed and Sealed this
Ninth Day of July, 2013

Teresa Stanek Rea
*Acting Director of the United States Patent and Trademark Office* a control system operable to receive a text message intended for a destination mobile device, to determine if the destination mobile device is LTE enabled responsive to receiving the text message, and to identify a mobile IP address assigned to the destination mobile device in the LTE network responsive to a determination that the destination mobile device is LTE enabled;

a delivery system operable to attempt to forward the text message to the destination mobile device over the LTE network based on the mobile IP address;

wherein the control system is further operable to identify a store-and-forward (SFD) message center for an originator of the text message responsive to a determination that the destination mobile device is not LTE enabled, and to forward the text message to the SFD message center for store-and-forward processing.--

The text in Claim 7, column 13, lines 15-36 reads,

"7. A method of delivering messages over a Long Term Evolution (LTE) network, the method comprising:
    receiving a text message intended for a destination mobile device;

determining if the destination mobile device is LTE enabled responsive to receiving the text message;

identifying a mobile IP address assigned to the destination mobile device in the LTE network responsive to a determination that the destination mobile device is LTE enabled; and attempting to forward the text message to the destination mobile device over the LTE network based on the mobile IP address responsive to a determination that the destination mobile device is LTE enabled;

identifying a store-and-forward (SFD) message center for an originator of the text message responsive to a determination that the destination mobile device is not LTE enabled; and forwarding the text message to the SFD message center for store-and-forward processing responsive to a determination that the destination mobile device is not LTE enabled."

should read

--7. A method of delivering messages over a Long Term Evolution (LTE) network, the method comprising:

receiving a text message intended for a destination mobile device;

determining if the destination mobile device is LTE enabled responsive to receiving the text message;

identifying a mobile IP address assigned to the destination mobile device in the LTE network responsive to a determination that the destination mobile device is LTE enabled;

attempting to forward the text message to the destination mobile device over the LTE network based on the mobile IP address responsive to a determination that the destination mobile device is LTE enabled;

identifying a store-and-forward (SFD) message center for an originator of the text message responsive to a determination that the destination mobile device is not LTE enabled; and forwarding the text message to the SFD message center for store-and-forward processing responsive to a determination that the destination mobile device is not LTE enabled.--